United States Patent Office 3,551,237
Patented Dec. 29, 1970

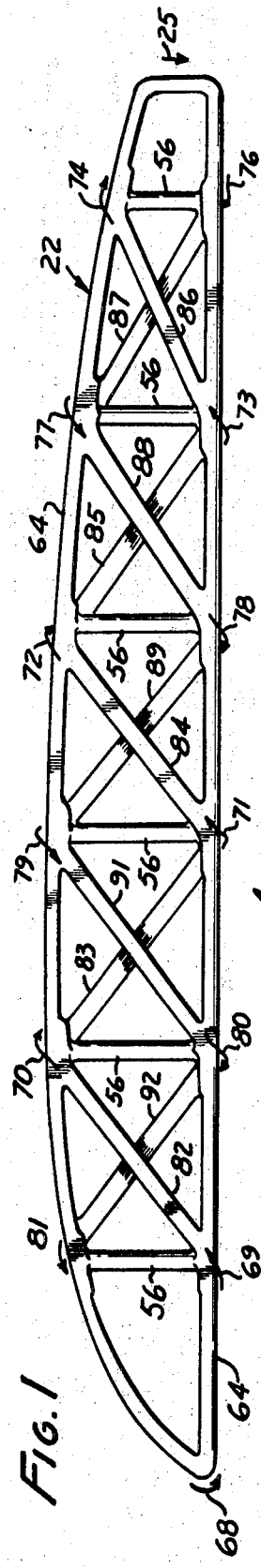

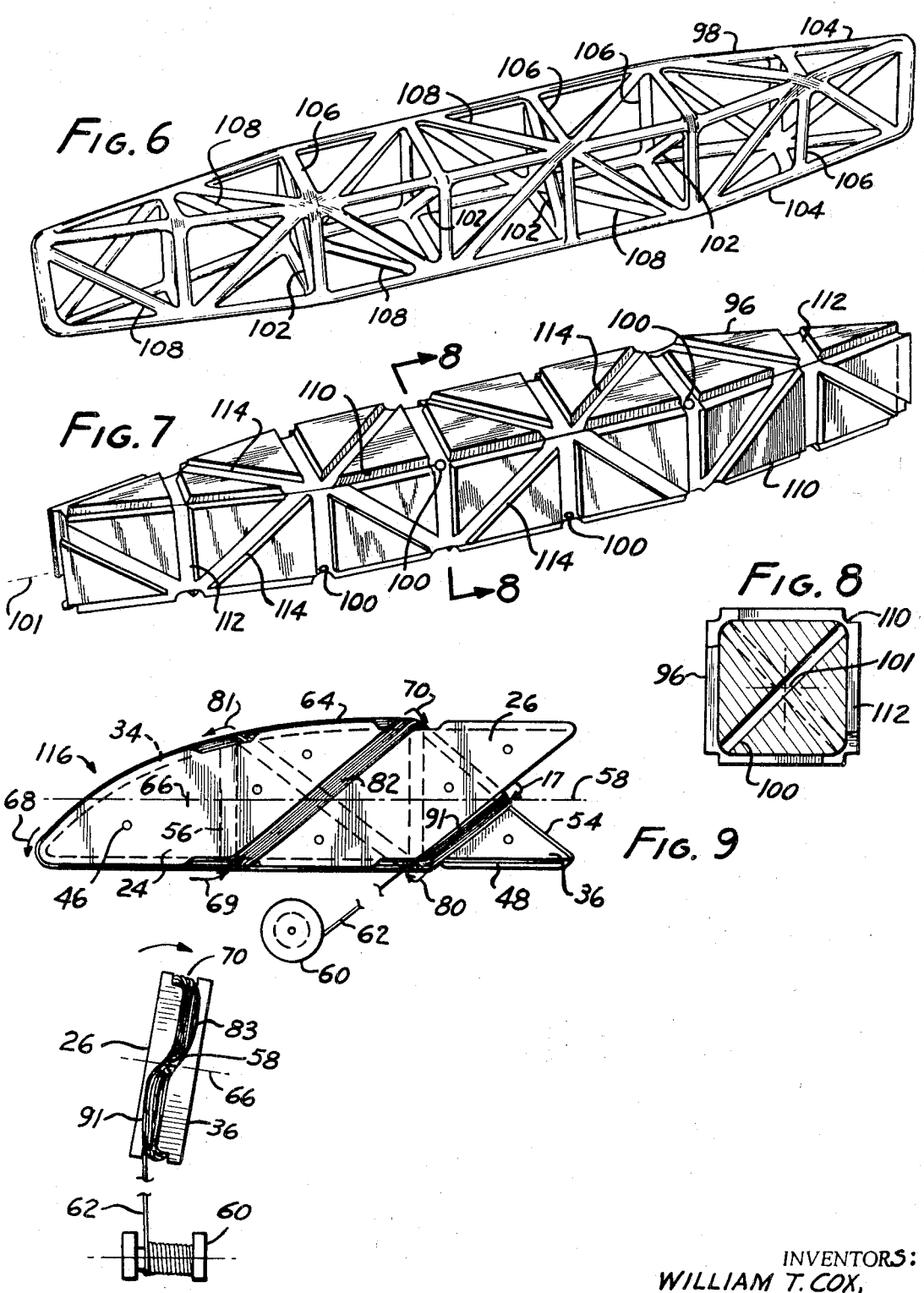

3,551,237
METHOD OF PREPARING FILAMENT-WOUND OPEN BEAM STRUCTURES
William T. Cox, Pomona, and Harold H. Buday, West Covina, Calif., assignors to Aerojet-General Corporation, El Monte, Calif., a corporation of Ohio
Filed Apr. 18, 1967, Ser. No. 635,299
Int. Cl. B65h 54/64, 81/06
U.S. Cl. 156—175                             9 Claims

ABSTRACT OF THE DISCLOSURE

According to the present disclosure, a filament roving is continuously wrapped through several channels on a mandrel so as to form diagonal members of a structural framework. The rovings are impregnated with a bonding material which is then cured, thereby forming a continuously-wound structure.

According to an optional but desirable feature of the disclosure, the mandrel is segmentable so that the structure may be continuously wound in sections, thereby affording greater strength to one section than to another section.

---

This invention relates to filament-wound structures such as trusses and frameworks for aircraft wings, and to methods and means for making such structures.

Heretofore the construction of filament-wound structures has involved the winding of several parallel windings of rovings of resin-impregnated filaments on a mandrel. The size of each roving depends upon the number of monofilaments contained therein, but 2000 to 3000 monofilaments per roving is considered typical. One problem with prior techniques for winding rovings for the construction of structures is that there is a tendency for the rovings to lose their shape and weaken the structure because the rovings are wound in parallel and are not capable of holding each other together until cured.

Structures are often subjected to greater stresses at one location than at another. In the manufacture of filament-wound structures, such as pressure vessels, a mandrel has heretofore been used whereby resin-impregnated filament roving was wound substantially uniformly over the mandrel in the shape of the particular structure. The structural member was constructed so that the entire member had a uniform strength factor which was high enough to satisfy the strength requirements for those portions of the structure to be subjected to the most severe loads. Thus, other portions not subjected to such severe loads contained more filament rovings than was necessary for such portions, thus adding weight to the structure. Such techniques are not desirable for open-beam structures, such as trusses for aircraft wings, because too many rovings will reduce the strength-to-weight ratio.

An object of the present invention is to provide a method for winding resin-impregnated filaments continuously upon a mandrel so that the rovings holds each other together before curing the resin.

Another object of the present invention is to provide a continuously-wound open beam structure.

Still another object of the present invention is to provide apparatus for continuously winding rovings to form an open beam structure.

Another object of the present invention is to provide a continuously-wound structure having sections having greater strength than other sections.

According to the present invention a mandrel having diagonal channels on different sides is provided for winding resin-impregnated filament rovings thereon. A roving is continuously wound on the mandrel in the diagonal channels and criss-crosses in the channels to form a structure. The resin is then cured, thus bonding the channels together to form a structure.

A preferred but optional feature of this invention resides in a segmented mandrel whereby the rovings may be wound in sections thereby affording greater strength in one section of the structure than in another.

The above and other features of this invention will be fully understood from the following detailed description and the accompanying drawings, in which:

FIG. 1 is a side elevation of a structure according to the presently preferred embodiment of the invention;

FIG. 2 is side elevation of a segmented mandrel according to the preferred form of the present invention for construction of the structure illustrated in FIG. 1;

FIG. 3 is a modification of the mandrel illustrated in FIG. 2;

FIGS. 4 and 5 are cross-sectional views taken at lines 4—4 and 5—5 in FIGS. 2 and 3, respectively;

FIG. 6 is a perspective view of another structure formed in accordance with the present invention;

FIG. 7 is a perspective view of a mandrel for construction of the structure illustrated in FIG. 6;

FIG. 8 is a cross-sectional view taken at line 8—8 of FIG. 7;

FIG. 9 is a side elevation illustrating the apparatus for winding rovings on a mandrel according to the present invention;

FIG. 10 is an end elevation of the method illustrated in FIG. 9; and

FIGS. 11 and 12 are side elevations of segments for use in the mandrel illustrated in FIG. 2.

Referring to FIGS. 1, 2, 4 and 9 to 12, there is illustrated a madrel 20 for winding filament rovings thereon to form an open beam structure 22, such as a rib for an aircraft wing. Mandrel 20 comprises a plurality of segments 24, 26, 28, 30, 32, 34, 36, 38, 40, 42 and 44; segments 24, 26, 30 and 32 being shown in the full view of FIG. 2; and segments 34, 36, 38, 40, 42 and 44 being shown behind segments 24, 26, 28, 30 and 32, in FIG. 2. An additional segment 45, illustrated in FIG. 11, has been removed from FIG. 2 to illustrate the detachability of the segments. This segment conforms in shape to one side of the right hand end (as shown in the drawings) of structure 22, and is fastened to segments 42 and 44. The segments of the mandrel are constructed from a suitable metal which resists deterioration due to chemical films which might be applied to it and to heat applied during the curing stages. Aluminum has been found to be satisfactory for the segments.

FIGS. 11 and 12 illustrate mandrel segments 45 and 42, respectively. The segments are fastened together by suitable fasteners such as bolts 46 and each is attached to at least two, and in some cases three, segments on the opposite side of the mandrel. By way of example, segment 45 is attached to segments 42 and 44, and segment 42 is attached to segments 30, 32 and 45. Each segment contains half channels 48 about its intended peripheral edge. Certain of the segments contain vertical half channels 50 between their peripheral edges for the formation of vertical members.

When the segments are assembled to form the mandrel illustrated in FIG. 2, the mated half channels 48 form a complete channel about the periphery of the mandrel and the mated half channels 50 form vertical channels. The segments on each side of the mandrel are spaced apart to form diagonal channels 52 on both sides of the mandrel between consecutive vertical channels and oblique to axis 58 at substantially equal angles. The sides of each channel 52 are formed by the two adjacent segments, and the bottom of each channel 52 is formed by the faces of the opposite mating segments. By way of example, the channel 52 between segments 24 and 26 has its bottom formed by the faces of segments 34 and 36 in the plane of the drawing and attached to segments 24 and 26.

To form a structure such as illustrated in FIG. 1, channels 48, 50 and 52 are coated with a suitable release film 54, such as Aclar release film available from Allied Chemical Company, Los Angeles, California. The release film may, if desired, be applied to the segments prior to the assembly of the mandrel to assure proper coating of the channels. The mandrel and release film may be heated prior to filament winding to remove impurities from the film and to harden the film to provide a rigid contact layer for the filament rovings.

Short strips 56 of filament rovings are placed in channels 50. The ends of strips 56 are frayed and laid over into channels 48.

One end of a continuous roving is attached to the mandrel at some location in channel 48 and the mandrel is rotated about axis 66 relative to payoff head 60 which guides roving 62. A small amount of tension is normally provided by payoff head 60 to aid in guiding the roving into the channel. Although mandrel 20 may be rotated about axis 66 and payoff head 60 held in a stationary position, it is understood that the payoff head may be rotated about the circumference of the mandrel, thereby achieving the same relative rotation. Axis 66 may therefore be located at any suitable position and is perpendicular to the plane of FIGS. 2 and 9 and in the plane of FIG. 10.

After several rotations about axis 66 of either the mandrel or the payoff head, or both, several layers of roving 62 will have been formed in channels 48. These rovings form periphery 64 of structure 22 which has a size dependent upon the number of revolutions and the thickness of the rovings.

The roving is then cut and the end of the roving guided by the payoff head is placed in a diagonal channel 52. Instead of cutting the roving on completion of periphery 64, it may be more desirous to clamp roving 62 at a position near a diagonal channel, in either case, the mandrel and payoff head are then relatively rotated about axis 58, shown in the plane of FIGS. 2 and 9 and perpendicular to axis 66 and to the plane of FIG. 10. Payoff head 60 is moved along axis 58 so that roving 62 is helically wound through channels 52 following arrows 68 to 81, consecutively, to form diagonal members 82–92.

It is understood that with each complete winding of roving 62 through channels 52 to form members 82–92, the rovings overlap or criss-cross each other at the junctions of the members with the periphery to thereby hold each other in place. It is also understood that the winding of the roving to form all the diagonal members is continuous throughout the entire structure.

Roving 60 is preferably impregnated with a bonding thermosetting resin, such as epoxy resin, before or during the winding operation. The thermosetting, resin-impregnated roving is cured by subjecting the article and mandrel to heat for a sufficient time to cure the resin. Thermosetting resins which are curable by other chemical or physical means, such as radiation or curing catalysts, may be used if desired. As one example, the uncured article may be heated to about 250–300° F. for a period of time of about 4–6 hours to obtain a complete cure. The temperature and length of time necessary to obtain a complete cure is dependent upon the size of the rovings and the type of resin used. One example of a suitable resin-impregnated roving is a glass filament roving, sold commercially by Owens Corning Company as "S901" roving, and impregnated with resin commercially available from U.S. Polymetric, Inc. as "E787." Other rovings may be used, and the choice depends upon particular strength factors to be satisfied as well as other factors. As examples of other rovings, silicon carbide, aluminum boron silicate and beryllium glass filaments may be used.

After the structure is cured, mandrel 20 is removed by removing bolts 46 and separating the segments forming the mandrel. Structure 22 is then ready for use. Also the mandrel may be reassembled for re-use.

In FIGS. 3 and 5 there is illustrated a modification of the mandrel illustrated in FIGS. 2 and 4. Mandrel 94, which is physically similar to assembled mandrel 20, contains peripheral channel 48, vertical channel 50 and diagonal channels 52 for constructing vertical member 56, peripheral member 64 and diagonal members 82–92. Mandrel 94 is constructed from a suitable detructible material such as Cerrobend, a fusable alloy having a melting point of about 180±10° F. and a composition of 26.5% lead, 13.5% tin, 50% bismuth and 10% cadmium. Other low-melting point alloys or even plastics may be used for forming mandrel 94. As one specific example, gypsum-based plastic, dissolvable in acetic acid, may be used.

To construct mandrel 94, a suitable master core is provided, conforming to the shape of the mandrel and constructed from suitable material such as plaster or steel. A flexible mold is cast around the master core and may be constructed of a suitable elastic material such as polyvinyl chloride, or the like. Mandrels 94 are cast in the molds by pouring suitable material such as Cerrobend into the mold and removing the mold after the mandrel has cooled to an ambient temperature. The method of constructing a suitable destructible mandrel is more adequately described in Patent No. 3,021,241 which is assigned to the same assignee as the present invention.

In FIGS. 6–8 there is illustrated a mandrel 96 for winding filament rovings to form structure 98. Mandrel 96 is a destructible mandrel, which may be formed from Cerrobend or other suitable material as described above in conjunction with mandrel 94. Short strips of rovings are placed in passages 100 to form members 102. Longitudinal members 104, circumferential members 106 and diagonal members 108 are then continuously wound through channels 110, 112 and 114, respectively, in a manner dependent upon strength factors and other considerations. Diagonal members 104 between consecutive members 102 are disposed at substantially equal angles to a plane normal to longitudinal axis 101 of the mandrel.

The rovings used for winding on mandrel 94 in FIGS. 3 and 5 and mandrel 96 in FIGS. 7 and 8 are similar to those hereiafter described and are heat-cured with sufficient time and temperature as necessary to cure the impregnated resin.

During the curing operation of a structure wound on a low-melting point mandrel, the temperature is first raised to approxmiately 180° F. to partially cure the resin and to permit the mandrel to melt out. The temperature is then raised to approximately 250–300° F. to finally cure the structure. Alternatively, a mandrel destructible by acid may be dissolved out after completely curing the article.

Structures are often subjected to greater stresses at one location than at another. For example, due to unbalanced loading and variations in forces on aircraft wings, certain portions of such wings must be structurally stronger than other portions.

In FIGS. 9 and 10 there is illustrated a method for continuously winding a structure whereby those portions of the structure which are subjected to more severe forces than other portions of the structure are made stronger due to additional windings of roving thereon. By reducing the number of rovings necessary for the portions of the structure not subjected to severe forces, the strength-to-weight ratio is increased.

A mandrel portion 116 is provided containing segments 24, 26, 34 and 36 fastened together by suitable fastening means such as bolts 46. For purposes of illustration it will be assumed that the left hand portion as shown in FIG. 1 of structure 22 is intended to be subjected to more severe forces than is the right hand portion. Therefore, the left hand portion of the structure must be the strongest section of the structure.

Segments 24, 26, 34 and 36 conform to the shape of the left hand portion of the structure. Release film 54 is applied to the mandrel as hereinbefore described, and vertical members 56 are positioned in the mandrel as hereinbefore described. The peripheral layer 64 of roving 62 is wound over the periphery until a sufficient number of rovings is wound thereon. The mandrel portion is then rotated relative to payoff head 60 about axis 58 and a sufficient number of rovings are continuously wound to form diagonal members 82 and 92 and part of diagonal members 83 and 91. The number of rovings applied to mandrel portion 116 is only that number necessary to provide the additional strength necessary for the left hand portion of the structure.

The remainder of the mandrel is then attached and additional rovings are continuously wound in the manner hereinbefore described. The resulting product is a structure having additional rovings throughout the left hand portion of the structure. In this manner, the left hand portion of peripheral 64 is strengthened as are diagonal members 82, 92 and a portion of diagonal members 83 and 91. It is noteworthy that the roving need not be cut when additional mandrel sections are being added, so that the final product is one which has been continuously wound.

When the complete mandrel has been attached, the entire mandrel is continuously wound in the manner hereinbefore described, thereby forming the structure with a minimum weight throughout and having additional strength in critical areas. It is understood that any portion of the structure may be strengthened in this manner, and that the mandrel may be "grown" in stages, thereby providing a structure with widely varying strength factors in different portions.

The present invention thus provides structures formed by continuously-wound filament rovings to provide greater strength-to-weight ratios. The method is effective and greatly reduces the likelihood of production of faulty structures. The segmented mandrel is advantageous for increasing the strength in certain sections of a continuously-wound structure while reducing the weight in other sections, thereby increasing the strength-to-weight ratio of the structure.

This invention is not to be limited by the embodiments shown in the drawings and described in the description which are given by way of example and not of limitation, but only in accordance with the scope of the appended claims.

We claim:

1. A method of forming an open beam structure comprising the steps of: placing strips of roving in a plurality of first channels on a removable mandrel substantially perpendicular to a longitudinal axis; wrapping a continuous roving in second, third, and peripheral channels on first and second sides and the periphery, respectively, of said mandrel, said peripheral channel being joined to each end of the first channels, and one end of each of said second and third chanels being joined to said peripheral channel at an intersection of said peripheral channel with a plane normal to said longitudinal axis containing one of said first channels, and the other end of each of said second and third channels being joined to said peripheral channel at an intersection of said peripheral channel with a plane normal to said longitudinal axis containing a consecutive first channel, said second and third channels being disposed oblique to said axis at substantially similar angles; impregnating the roving with a bonding material; curing the bonding material to form an open beam structure having first, second, third and peripheral members formed from the rovings in said first, second, third and peripheral channels, respectively; and removing the mandrel.

2. A method of forming an open beam structure according to claim 1 wherein the step of continuously wrapping a roving in said second and third channels comprises the steps of rotating a roving payoff head about said longitudinal axis relative to said mandrel and guiding said roving into said channels by moving the payoff head in a direction parallel with said axis.

3. A method of forming an open beam structure according to claim 1 wherein the wrapping of the roving in said second and third channels includes guiding the roving into the channels by moving a roving payoff head helically about said axis.

4. A method of forming an open beam structure according to claim 1 further including continuously wrapping the roving through said second channel, a fourth channel on said second side of said mandrel, said peripheral channel, a fifth channel on said first side of said mandrel, and said third channel, consecutively; the second and fourth channels being joined together and to the peripheral channel at one end, and the third and fifth channels being joined together and to the peripheral channel at one end.

5. A method of forming an open beam structure according to claim 1 wherein the removal of the mandrel is accomplished by segmenting the mandrel.

6. A method of forming an open beam structure according to claim 1 wherein the removal of the mandrel is accomplished by destroying the mandrel.

7. A method according to claim 4 wherein the roving is continuously wrapped in said second channel, said third channel, said peripheral channel, consecutively and repetitively, and thereafter is wrapped in said second channel, said fourth channel, said fifth chanel, said third channel and said peripheral channel, consecutively and repetitively.

8. A method according to claim 1 wherein the ends of said second and third members are joined to opposite ends of consecutive first members to substantially form an X configuration between each first member and said peripheral member is joined to the ends of the first members.

9. A method according to claim 1 wherein the strips of roving are placed in a first channel on a mandrel segment and a second mandrel segment is attached to said first mandrel segment to form a portion of the peripheral channel and said second and third channels, said roving is then continuously wrapped in said second channel, and third channel and said peripheral channel consecutively and repetitively, said method further including attaching third and fourth mandrel segments to said first and second mandrel segments to form an additional portion of said peripheral channel and to form fourth and fifth channels, and thereafter continuously wrapping roving in said second channel, fourth channel, fifth channel, third channel and peripheral channel, consecutively and repetitively.

References Cited

UNITED STATES PATENTS

| | | | |
|---|---|---|---|
| 3,203,845 | 8/1965 | Short | 156—175 |
| 3,308,001 | 3/1967 | Angrave | 156—190X |
| 3,403,844 | 10/1968 | Stoffer | 156—173X |
| 3,425,982 | 2/1969 | Fink | 156—173X |
| 3,429,758 | 2/1969 | Young | 156—173X |

BENJAMIN R. PADGETT, Primary Examiner

U.S. Cl. X.R.

156—155, 173